United States Patent
Yang et al.

(10) Patent No.: US 9,599,809 B2
(45) Date of Patent: Mar. 21, 2017

(54) CONTROL SYSTEM FOR IMPLEMENTING NON-LINEAR INTERFERENCE COMPENSATION FOR TORSION ANGLE OF ASTRONOMICAL TELESCOPE

(71) Applicant: NANJING INSTITUTE OF ASTRONOMICAL OPTICS & TECHNOLOGY, CHINESE ACADEMY OF SCIENCES, Nanjing (CN)

(72) Inventors: Shihai Yang, Nanjin (CN); Guomin Wang, Nanjing (CN)

(73) Assignee: NANJING INSTITUTE OF ASTRONOMICAL OPTICS & TECHNOLOGY, CHINESE ACADEMY OF SCIENCES (CN)

( * ) Notice: Subject to any disclaimer, the term of this patent is extended or adjusted under 35 U.S.C. 154(b) by 48 days.

(21) Appl. No.: 14/423,735

(22) PCT Filed: Jun. 25, 2013

(86) PCT No.: PCT/CN2013/077907
§ 371 (c)(1),
(2) Date: Feb. 25, 2015

(87) PCT Pub. No.: WO2014/032464
PCT Pub. Date: Mar. 6, 2014

(65) Prior Publication Data
US 2015/0212311 A1    Jul. 30, 2015

(30) Foreign Application Priority Data
Sep. 3, 2012    (CN) .......................... 2012 1 0319991

(51) Int. Cl.
*G05D 3/12* (2006.01)
*G02B 23/16* (2006.01)
(Continued)

(52) U.S. Cl.
CPC .............. *G02B 23/16* (2013.01); *F16H 13/14* (2013.01); *G05B 19/404* (2013.01); *G05D 3/12* (2013.01)

(58) Field of Classification Search
CPC ....................................................... G02B 23/16
(Continued)

(56) References Cited

U.S. PATENT DOCUMENTS 5,760,562 A * 6/1998 Woodland .............. G05B 19/33
                                                   318/632
7,076,352 B2 * 7/2006 Kohno ................... B62D 5/049
                                                 318/400.15
7,146,863 B2 * 12/2006 Furui ................... G11B 5/4833
                                                    73/847

FOREIGN PATENT DOCUMENTS

CN          2035024 U       3/1989
CN          2339550 Y       9/1999
(Continued)

OTHER PUBLICATIONS

International Search Report; PCT/CN2013/077907; International Filing Date: Jun. 25, 2013; 2 pgs.

*Primary Examiner* — David S Luo
(74) *Attorney, Agent, or Firm* — Schmeiser, Olsen & Watts, LLP

(57) ABSTRACT

A control system for implementing nonlinear interference compensation for a torsion angle of an astronomical telescope is provided. The system includes a torsion angle detection system and a torsion angle compensation and amendment system. The torsion angle detection system is provided with a measurement mechanism for measuring the position of a driving wheel, and a position signal of the measurement mechanism is fed back to an industrial personal computer in the torsion angle compensation and amendment system in real time. An output signal of the (Continued)

industrial personal computer controls a compensation motor to rotate, and the compensation motor inclines an elastic plate with the driving wheel mounted thereon through a transmission mechanism, to further cause the torsion of the driving wheel by an angle and form compensation to the torsion angle.

7 Claims, 2 Drawing Sheets

(51) Int. Cl.
      *F16H 13/14*     (2006.01)
      *G05B 19/404*   (2006.01)

(58) Field of Classification Search
     USPC .................................................. 318/1, 3, 34
     See application file for complete search history.

(56) References Cited

FOREIGN PATENT DOCUMENTS

| | | |
|---|---|---|
| CN | 101231386 A | 7/2008 |
| WO | 2014032464 A1 | 3/2014 |

\* cited by examiner

CONTROL SYSTEM FOR IMPLEMENTING NON-LINEAR INTERFERENCE COMPENSATION FOR TORSION ANGLE OF ASTRONOMICAL TELESCOPE

CROSS-REFERENCE TO RELATED APPLICATIONS

This application claims priority to PCT Application No. PCT/CN2013/077907, having a filing date of Jun. 25, 2013, based on Chinese Application No. 201210319991.0 filed on Sep. 3, 2012, the entire contents of which are hereby incorporated by reference.

FIELD OF TECHNOLOGY

The following is a control method for non-linear interference compensation, specifically a control system for implementing non-linear interference compensation for torsion angle of an astronomical telescope. Embodiments of the invention are the research results of "research on friction driving sliding dynamic amendment system for extremely large telescope", a project of national natural science foundation (10778630) and "research on low temperature non-linear interference compensation in low speed high precision tracking by large-caliber astronomical optical telescope at Antarctica" (jointly financed by the "333" program of Jiangsu Province), a surface project of national natural science foundation (11073034).

BACKGROUND

Friction drive is a very good way to drive a astronomical telescope. This drive has obvious advantages to an astronomical telescope: the structure design and manufacturing is simple. For the same performance requirement, friction drive has the lowest cost, which means highest performance to price ratio; it has no cyclic accumulated error and no no-load return; the telescope drive is stable without vibration, and the response is quick, able to obtain very high drive precision at low speed; the friction driving wheel and driven parts can have high drive ratio, which means reduced motor torque and low-speed performance requirements, therefore, serial commercial motors can be used, normally without the need to have a tailor-made motor, thus greatly reducing the cost.

Presently, an external cylindrical rolling friction drive is adopted for many known large-caliber telescopes at home and overseas. The drive pair consists of a driving wheel and driven wheel, and the driven wheel is directly mounted on the same shaft of the telescope body. The driving wheel presses on the driven wheel with the action of the pressing device, the motor drives the driving wheel, and the movement is transferred by the friction force between the external cylindrical contact surfaces of the driving and driven wheels. In rolling friction drive, the rotating axial lines of the driving and driven wheels should be parallel as ideal positions in space, however, due to mounting error and deformation of supporting structure operation long-term operation under gravity, there is an angle between their rotating axial lines in space. The angle between the driving wheel rotating axial line and driven wheel rotating axial line at their junction within the tangential plane is referred to as torsion angle, as shown in FIG. 1. Torsion angle is a special non-linear interference, which results in the change of the contact surfaces of driving wheel A and driven wheel B, greatly reducing the contact area from a rectangular contact zone over the whole thickness to a very small part of circular section of the original contact surface. This will lead to sliding displacement between the driving wheel and driven wheel.

The friction drive with the presence of a torsion angle is similar to torsion wheel friction drive. Because of the presence of the torsion angle, the friction force produces a component in the direction of the friction wheel rotating axial line, under the action of this component, the friction wheel will move in the axial direction, however, such axial movement is restricted, and elastic deformation of structure will take place instead. In the working process of the astronomical telescope with friction drive, this elastic deformation gradually increases, so does the corresponding elastic recovering force. When the elastic recovering force has exceeded the friction force between the friction wheel contact surfaces, the friction wheels will "skip suddenly" back to the balanced position. Normally, the driven wheel is connected with the telescope proper, with great weight and very high rigidity, and comparatively, the supporting rigidity of the driving wheel is not so high. Therefore, such "sudden skip" mostly occurs on the driving wheel. The interference produced by the torsion angle on the telescope is a special non-linear interference, finally, it will result in fluctuation of the driven load, and affecting the low speed stability of the telescope and its precision to track the celestial bodies. Presently in the area of astronomical telescope, there is no practically feasible technical solution to this torsion angle non-linear interference. Only the robustness of the control algorithms (such as the classical PID) of the telescope direction tracking system is depended to suppress the sudden skip caused by torsion angle. However the effect is usually not satisfactory and it can only alleviate to a certain extent the effect of sudden skip on the telescope low speed tracking precision.

The patent application with the filing No. CN200810020722.8 disclosed a dynamic correcting system for the rolling friction drive rotating shaft torsion angle of extremely large astronomical telescopes. This dynamic correcting system can always maintain tangentially parallel the driving wheel rotating axial line and driven wheel rotating axial line in the friction drive process, to ensure synchronous movement of driving wheel and driven wheel, avoid the occurrence of "sudden skip" and ensure stable operation of the telescope. The patent application with the No. CN200810020722.8 is mainly based on mechanical design.

SUMMARY

An aspect relates to a control system for implementing non-linear interference compensation for torsion angle of an astronomical telescope. The technical problem to be solved is to automatically detect and compensate for the non-linear interference caused by the torsion angle to the astronomical telescope, thereby eliminating the fluctuation in the driven load, and improving the low speed stability of the telescope and its precision to track the celestial bodies. This aspect constitutes further development and improvement on the basis of the patented technology with the file No. CN200810020722.8. The following is about the design of the control system.

The technical plan of embodiments of the invention are: a control system for implementing non-linear interference compensation for a torsion angle of an astronomical telescope, the system comprises a torsion angle detection system and a torsion angle compensation and amendment system, wherein that the said torsion angle detection system is provided with a measurement mechanism for measuring the position of a driving wheel, and the position signal of the measurement mechanism is fed back to an industrial personal computer in the torsion angle compensation and amendment system; the output signal of the industrial personal computer controls a compensation motor to rotate, and the compensation motor inclines an elastic plate with the driving wheel mounted thereon through a transmission mechanism, to further cause the torsion of the driving wheel by an angle and form compensation to the torsion angle.

This is a closed-loop position control system.

In the optimized plan of embodiments of the invention,

For the said measurement mechanism in the torsion angle detection system, linear optical grating scale is recommended to measure the position of the driving wheel.

The said industrial personal computer is provided inside the PCL-728 analog output card, which outputs signal to control the compensating motor.

Recommended connection of the said industrial personal computer with the compensation motor: the output signal from the PCL-728 analog output card within the said industrial personal computer, via a DC motor drive, drives a brush DC motor to rotate.

Ball screw connected with the motor shaft is recommended as the drive mechanism of the same compensation motor.

The said industrial personal computer is provided with control software.

More specifically and more preferably, the control system of embodiments of the invention comprises three main parts: the torsion angle detection system, torsion angle compensation and amendment system and software. The linear optical grating scale is used to measure the position of the driving wheel; the linear optical grating scale signal is read into the industrial personal computer via the IK220 card of Heidenhain Company. At the ideal position that the rotating axial lines of driving and driven wheels are parallel in space, the position signal of the linear optical grating scale is recorded, as $L_0$. When the telescope tracks celestial bodies, the position signal L of the linear optical grating scale is fed back to the industrial personal computer in real-time. So the torsion angle $\theta=\arctan[(L-L_0/L_0]$ is obtained. Within the industrial personal computer is provided with a PCL-728 analog output card, its output signal controls a DC motor drive, which drives a brush DC motor to rotate, and via the ball screw connected with the motor shaft, to incline the elastic plate whereon the driving wheel is mounted, in this way, the driving wheel revolves actively an angle as compensation, to eliminate the torsion angle between the driving and driven wheels. This is a closed-loop position control system. The torsion angle is eliminated by revolving the driving wheel instead of driven wheel because the driven wheel is the rack turntable of the telescope, the turntable of a large-caliber telescope weighs dozens to even 100s of tons, so it is difficult to implement the artificial torsion of angle, but the driving wheel is small, and the angle adjustment can be implemented more easily.

The software is compiled with C language under Windows, to implement the real-time closed-loop control of non-linear interference and graphic display of screens. The position closed loop of torsion angle is realized on the industrial personal computer, and the classical PID control algorithm is used for its control.

The beneficial result of embodiments of the invention is:
1. It can implement dynamic detection and compensation amendment of torsion angle position error, the torsion angle can be detected dynamically online and adjusted in real-time, to maintain an ideal contact position of driving and driven wheels.
2. The whole system can respond dynamically quickly, with high control precision.
3. Embodiments of the invention can save large amount of manpower, materials and time cost in mounting, adjustment and maintenance.
4. The method in embodiments of the invention can be implemented easily, with good repeatability and high reliability, and high value of application.

BRIEF DESCRIPTION

Some of the embodiments will be described in detail, with reference to the following figures, wherein like designations denote like members, wherein.

DETAILED DESCRIPTION

In the following, embodiments of the invention are further described in conjunction with attached drawings and embodiment.

Figure 1:
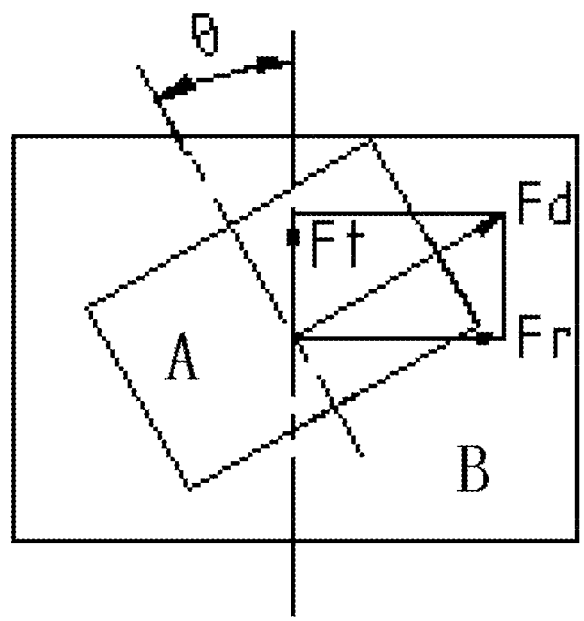
FIG. 1 is the schematic diagram of the torsion angle of friction drive.
Figure 2:
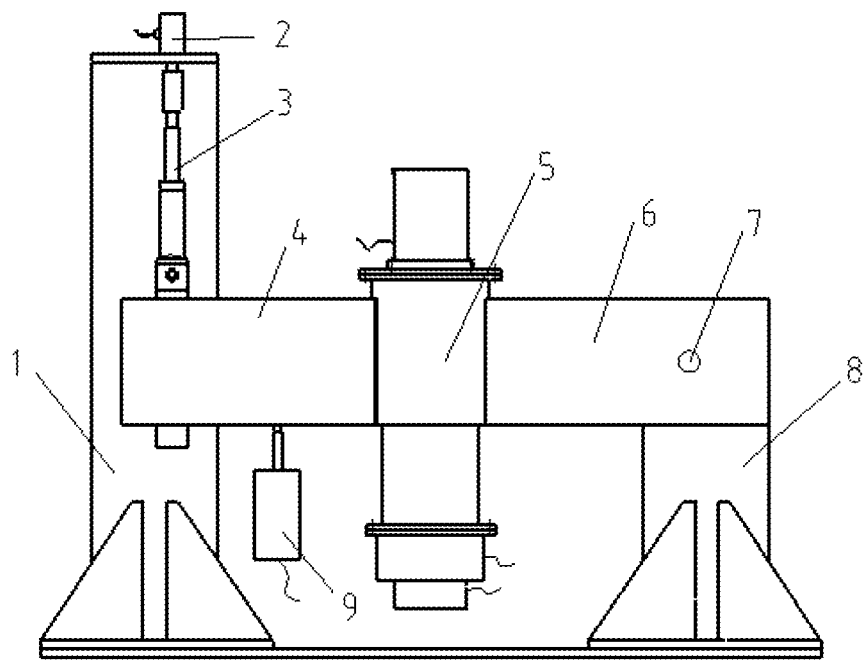
FIG. 2 is the control system electrical element arrangement drawing.
Figure 3:
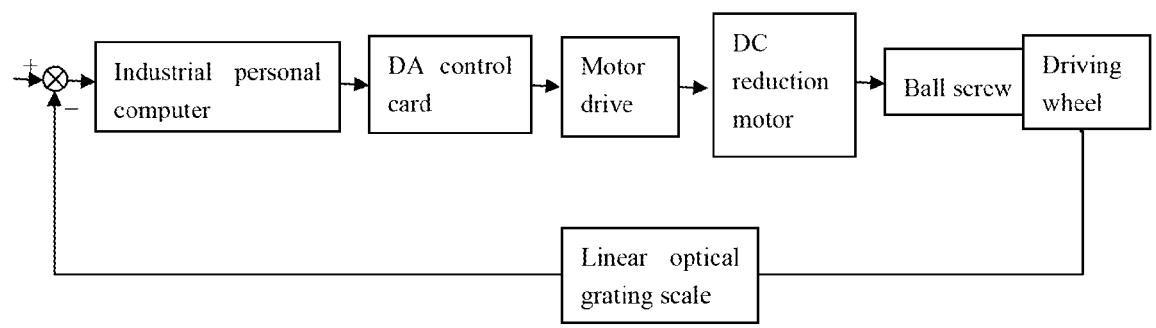
FIG. 3 is the principle diagram of the control system.

Embodiment presents a control system for automatic detection and compensation of torsion angle, the physical unit is as shown in FIG. 2, and the electrical element arrangement drawing of the control system is as shown in FIG. 3, including: left post 1, DC motor 2, ball screw 3, left elastic plate 4 for mounting driving wheel, driving wheel 5, right elastic plate 6 for mounting driving wheel, rotating pivot 7, right post 8 and linear optical grating scale 9.

The control process flow is as shown in FIG. 3. The control system for automatic detection and compensation of telescope torsion angle comprises of three parts: telescope torsion angle detection system, torsion angle compensation system and software.

The actuating unit of the torsion angle automatic detection and compensation control system is a DC brush reducing motor, the DC brush motor driver 2KS 010D(2)-3A-24V of Shanghai Guili is used, and the current loop of the compensation mechanism realizes a closed-loop for this motor driver.

The torsion angle position detection and compensation amendment closed loop is performed by an industrial personal computer. The industrial personal computer is Advan-Tech IPC-610, with the configuration as: the CPU being Core 2 Duo 2.8 G, and the memory capacity is 4 G.

The angle between the driving wheel and driven wheel rotating axial line in space is indirectly measured with a linear optical grating scale on the contact surfaces of the friction wheels. The linear optical grating scale model is Heidenhain MT1201, outputting sinusoidal current signal (11 uApp), with a range of 12 mm and 6000 scale lines, the maximum error within a signal cycle is 0.02 um, and the signal is divided by 4096 after being input into the IK220 card.

In this case, each scale line represents $(12/6000)\times10^3=2$ um, and after being divided by 4096, 1 count=2/4096=0.00048828125 um A DC brush motor with reducer is selected as driving motor, and its performance parameters are as shown in Table 1. By using a DC motor with reducer, a high torque can be provided with a small motor, to effectively cut cost.

TABLE 1

Main technical parameters of the DC speed reduction motor 36ZY126000

| | |
|---|---|
| Reduction ratio | 1/270 |
| Speed | 22 r/min |
| Voltage | 12 VDC |
| No load current | ≤350 mA |
| Load current | ≤1300 mA |
| Torque | 20 Kg · cm |

The analog output card is PCL-728 of Taiwan AdvanTech, which is a PCI bus interface. The PCL-728 provides two double-buffer 12-bit D/A analog conversion outputs, to output+/−10V command signal to the motor driver.

The software operating on the industrial personal computer is based on the WINDOWS XP operating system, and compiled with VC++6.0 language, to realize classical PID closed-loop control, real-time detection and monitoring, screen graph display and parameter setting.

Although the present invention has been disclosed in the form of preferred embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements. The mention of a "unit" or a "module" does not preclude the use of more than one unit or module.

The invention claimed is:

1. A control system for implementing non-linear interference compensation for a torsion angle of an astronomical telescope, the system comprises:
   a torsion angle detection system and a torsion angle compensation and amendment system, wherein the torsion angle detection system is provided with a measurement mechanism for measuring a position of a driving wheel, wherein, when the astronomical telescope tracks celestial bodies, a position signal of the measurement mechanism is fed back, in real-time, to an industrial personal computer in the torsion angle compensation and amendment system;
   wherein the industrial personal computer has an output signal which controls rotation of a compensation motor, and wherein the compensation motor inclines an elastic plate with the driving wheel mounted thereon through a transmission mechanism, to further cause the torsion of the driving wheel by an angle and form compensation to the torsion angle.

2. The control system for non-linear interference compensation for a torsion angle of an astronomical telescope according to claim 1, wherein a linear optical grating scale is used as the measurement mechanism in the torsion angle detection system.

3. The control system for non-linear interference compensation for a torsion angle of an astronomical telescope according to claim 1, wherein within the industrial personal computer is provided with a PCL-728 analog output card, which outputs signal to control the compensation motor.

4. The control system for non-linear interference compensation for a torsion angle of an astronomical telescope according to claim 1, wherein the connection of the industrial personal computer with the compensation motor is: the output signal from the PCL-728 analog output card within the industrial personal computer, via a DC motor driver, drives a brush DC motor to rotate.

5. The control system for non-linear interference compensation for a torsion angle of an astronomical telescope according to claim 1, wherein the driving mechanism of the compensation motor is a ball screw connected with the motor shaft.

6. The control system for implementing non-linear interference compensation for a torsion angle of an astronomical telescope according to claim 2, wherein the linear optical grating scale outputs a sinusoidal current signal 11 uApp, with a range of 12 mm and 6000 scale lines, the maximum error within a signal cycle is 0.02 um, and the signal is divided by 4096 after being input into the IK220 card.

7. A control system for implementing non-linear interference compensation for a torsion angle of an astronomical telescope, the system comprises:
   a torsion angle detection system and a torsion angle compensation and amendment system, wherein the torsion angle detection system is provided with a measurement mechanism for measuring a position of a driving wheel, and a position signal of the measurement mechanism is fed back to an industrial personal computer in the torsion angle compensation and amendment system;
   wherein the industrial personal computer has an output signal which controls rotation of a compensation motor, and wherein the compensation motor inclines an elastic plate with the driving wheel mounted thereon through a transmission mechanism, to further cause the torsion of the driving wheel by an angle and form compensation to the torsion angle;
   wherein the linear optical grating scale outputs a sinusoidal current signal 11 uApp, with a range of 12 mm and 6000 scale lines, the maximum error within a signal cycle is 0.02 um, and the signal is divided by 4096 after being input into the IK220 card.

* * * * *